United States Patent

[11] 3,599,957

[72] Inventor Leland F. Blatt
24121 Mound Road, Grosse Pointe, Mich. 48093
[21] Appl. No. 819,546
[22] Filed Apr. 28, 1969
[45] Patented Aug. 17, 1971

[54] CAM WEDGE POWER SWING AWAY WITH GUIDED ARM
7 Claims, 4 Drawing Figs.

[52] U.S. Cl..................................................... 269/32, 269/233, 269/239
[51] Int. Cl...................................................... B23q 3/08
[50] Field of Search........................................... 269/32, 233, 239, 58, 59, 31

[56] References Cited
UNITED STATES PATENTS
3,035,831 5/1962 Blatt............................ 269/239 X
3,147,004 9/1964 Blatt............................ 269/239 X Primary Examiner—Andrew R. Juhasz
Assistant Examiner—Donald D. Evenson
Attorney—Cullen, Sloman & Cantor ABSTRACT: In a power clamp having within its housing a cylinder and piston rod and a swing arm pivoted on the housing and cam rollers connected to the rod and movable in angular slots in said arm to pivot the arm from "swing away release" to "work-locating position," the improvement which consists of stop means on the housing to adjustably limit the movement of the arm to locating position, together with lateral thrust means on the arm pivot between the housing and arm on its opposite sides and additional power operated lateral thrust means on the housing remote from the arm pivot operatively and slidably engageable with said arm upon its opposite sides as it pivots to workpiece-locating position said arm including a swing away clamping means for retainingly engaging one or more workpieces.

INVENTOR
LELAND F. BLATT

CAM WEDGE POWER SWING AWAY WITH GUIDED ARM

BACKGROUND OF THE INVENTION

Heretofore, in industry in connection with the machining of a workpiece or the welding or connecting of a pair of workpieces together upon a jig or fixture, various clamping devices have been provided for immovably securing the workpiece or workpieces with respect to a stationary support during the machining and or welding operation.

It is an object of the present invention to provide an improved highly efficient power operated clamp adapted for locating and effectively gripping and retaining a workpiece with respect to a jig or fixture for a welding or other machining operation.

It is another object to provide an improved cam wedge power operated mechanism for arcuately adjusting the workpiece locating arm from a "swing away release position" to a "workpiece locating position."

It is another object to provide an improved clamp with adjustable means for limiting the power operated swing movement of the locating arm.

It is another object to provide an improved lateral thrust engaging means interposed between the housing walls and the swing arm on its opposite sides for eliminating wobble and slop of said arm as it moves to workpiece locating position.

These and other objects will be seen from the following specification and claims in conjunction with the appended drawing in which:

FIG. 4 is a fragmentary view on a reduced size similar to FIG. 1 illustrating the mounting of a power clamp in workpiece-securing position.

Figure 1:
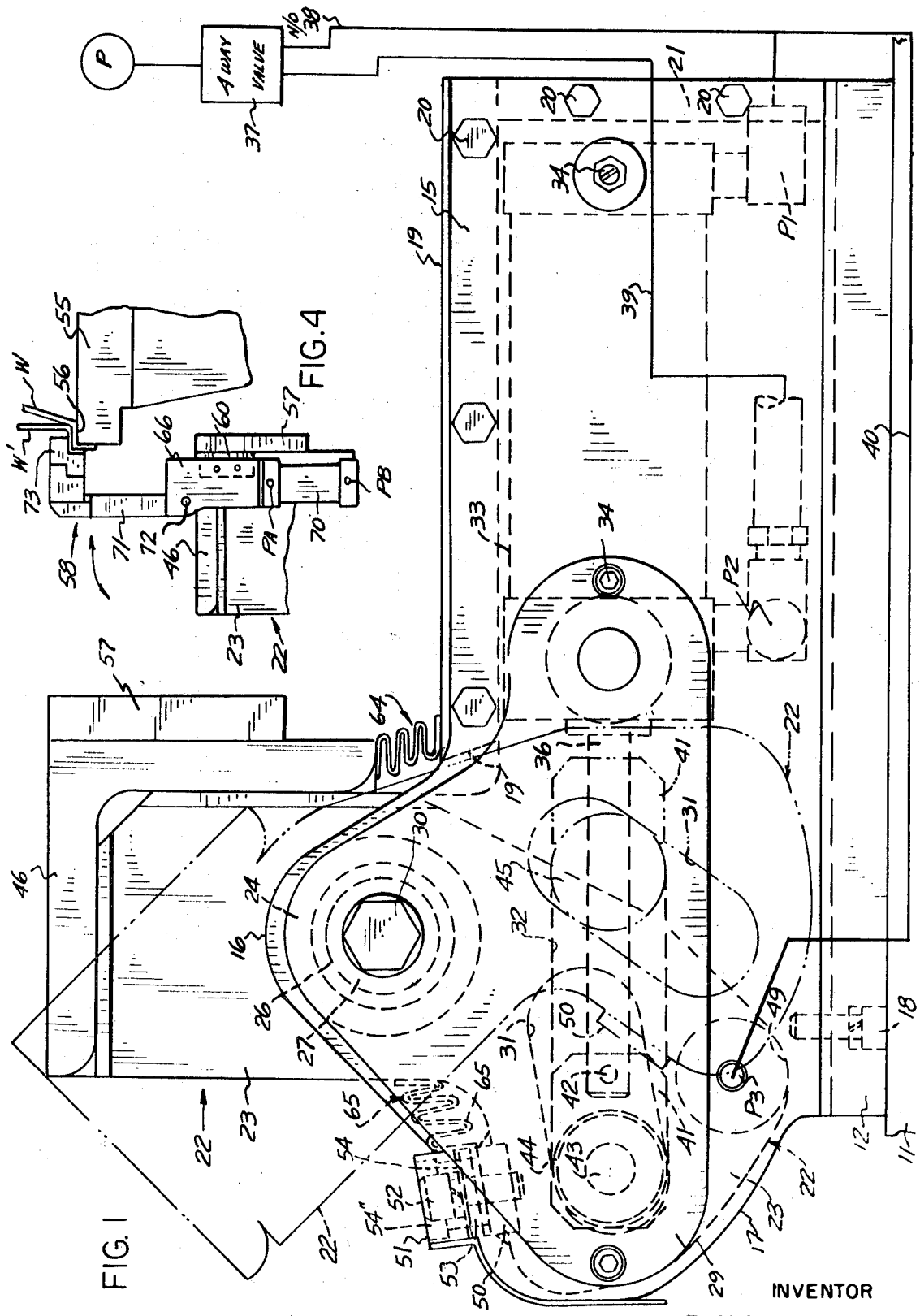
FIG. 1 is a partly broken away fragmentary side elevational view of the present power clamp.

Referring to the drawing, the present cam wedge power clamp or workpiece locating and retaining means is mounted upon a jig or fixture fragmentarily shown at 11 and includes a base plate 12 secured thereto by fasteners 13.

Within parallel spaced slots 14 in said base plate, there are provided a pair of upright housing sideplates 15 with sideplate extension 16 at their one ends; portions of said sideplates at one end being designated at 17, FIG. 1, said sideplates being secured upon base plate 12 by a series of fasteners 18.

Said housing includes cover plate 19 which extends between upper portions of the sideplates 15 adjacent their one ends and secured thereto by fasteners 20. The housing also includes the protective closure end plate 21 similarily secured by fasteners 20.

Adjacent the opposite end of the housing between the sideplate portions 16 and 17, FIG. 1, there is provided a power operated swing arm 22 which is interposed between the sideplates and pivotally mounted thereon.

For this purpose, said swing arm includes upright parallel spaced sideplates 23 with central spacer 24 and end spacer 25 interposed between and fixedly connected thereto.

Figure 2:
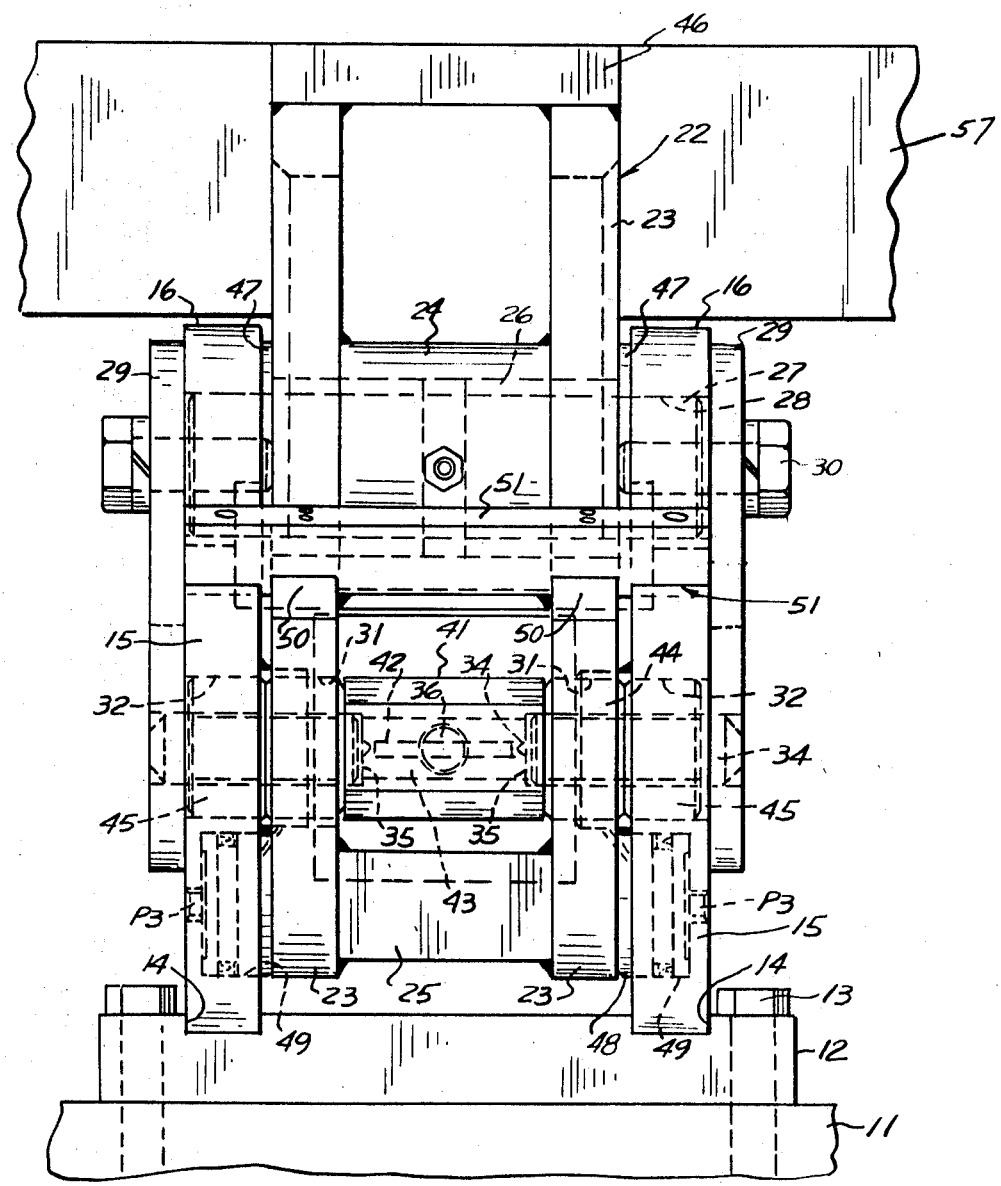
FIG. 2 is a left end elevational view thereof.

Bushings 26, FIG. 2 nested within spacer 24 are journaled upon pivot shaft 27 which extends between housing sideplates 15—16 within apertures 28, FIG. 2 and is secured therein by the fasteners 30 which extend through retainer plates 29.

A pair of opposed spaced horizontally extending bearing guide slots 32 are formed through housing sideplates 15—16. An additional pair of opposed spaced slots 31 are formed within the swing arm sideplates 23 inclined at an acute angle with respect to slots 32.

Power cylinder 33 is nested within one end of said housing adjacent end plate 21 and retained therein by the longitudinally spaced pairs of support pins 34 which are threaded through housing sideplates 15 and extend within corresponding longitudinally spaced bores within the wall of air cylinder 33, as shown at 35, FIG. 2.

Said cylinder includes a conventional piston and the axially extending reciprocal piston rod 36 and the respective pair of pressure intake and exhaust ports P1 and P2 connected to the remote control four way valve 37 by the respective conduits 38 and 39, shown schematically in FIG. 1.

Additional conduits 40 are adapted to supply pressure fluid from conduit 38 to the additional pressure fluid intake ports P3 upon opposite sides of the housing adjacent sideplate portions 17, FIG. 1 for communication with respective cylinders or bores 49, FIGS. 1 and 2.

Within the end of said housing, remote from endplate 21 corresponding to portions 17 of said sideplates, there is provided a cylinder rod end 41 which threadedly receives the end of the piston rod 36 which is fixedly secured thereto by the transverse pin 42.

Bearing shaft 43 extends transversely through cylinder rod end 41. As shown in FIGS. 1 and 2, inner pair of roller bearings 44 are journaled upon shaft 43 and movably positioned within the swing arm sideplates slots 31. An additional outer pair of bearings 45 are mounted upon shaft 43 and in engagement with but outwardly of bearings 44 and movably positioned within the housing sideplate slots 32.

The swing arm construction includes over its upper end portions and the forward edges of the respective sideplates 23 therefore, the machined angle plate 46 suitably secured thereto by welding.

Thrust washers 47 are mounted upon pivot shaft 27 snugly and guidably interposed between the housing and swing arm sideplates, FIG. 2, to provide a snug pivotal mounting for said swing arm.

Within the aforementioned cylinders 49 formed within housing sidewall elements 17 are movably positioned the pistons 48 which project inwardly of said bores for operative sliding cooperative and snug engagement with lower end portions of the swing arm sideplates 23 as best shown in FIG. 2.

The thrust washers 47 as well as the power operated pistons 48 are intended for the purpose of snug sliding engagement with adjacent portions of the swing arm sideplates to eliminate slop and wobble and to provide a precision controlled movement for said swing arm.

Means are provided upon the trailing side of the swing arm 22 for limiting its pivotal movements from the swing away retracted position shown in dotted lines in FIG. 1 to the forward workpiece locating solid line position. For this purpose, there are provided upon the trailing edges of the swing arm sideplates 23 a pair of stop blocks 50 fixedly secured thereto FIGS. 1 and 2.

An additional stop block assembly is fixedly mounted upon and across the end of the housing plates 17. This assembly includes transversely arranged stop block holder 51 which is interposed between the housing sideplates and secured thereon by fasteners 52.

Transversely spaced stop blocks 53 are positioned under stop block holder 51 with adjusting shims 54 interposed and fixedly secured thereto by the additional fasteners 54", FIG. 1.

As shown in FIG. 1 in the dotted line position of the swing arm, the stop blocks 50 on said swing arm are normally spaced from the corresponding stationary stop blocks 53 and on pivotal movement of said swing arm, are positioned in parallel engaging relation for limiting the forward swing movement of said arm in a clockwise direction to the solid line position shown in FIG. 1.

The power cam wedge clamping device is mounted upon a suitable jig or fixture 11 fragmentarily shown and in the work-retaining or locating position shown in FIG. 1 in solid lines, is adapted to assist in locating and anchoring a workpiece to be machined or to be welded to another workpiece, for illustration. In example, this would be in a vehicle body the welding of one part to a quarter panel, for illustration.

Figure 3:
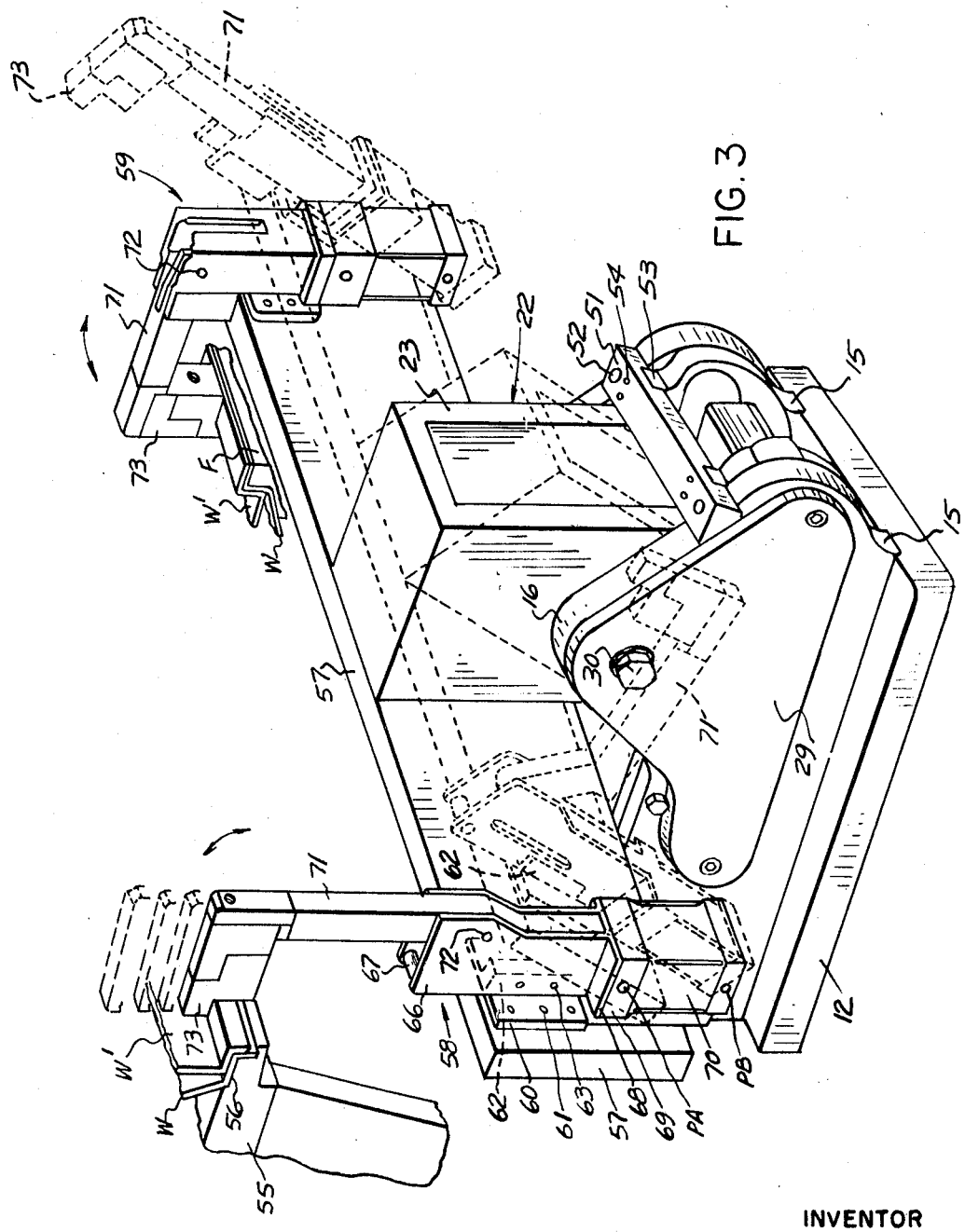
FIG. 3 is a perspective view thereof.

In the illustrative embodiment, there is provided FIGS. 1 and 3 a base support 55 of a predetermined contour 56 adapted to supportably receive workpiece W such as a quarter panel of a vehicle body.

The secondary workpiece W' has a correspondingly shaped portion which is normally brought into registry with workpiece W in a preliminary assembly with respect to the base support 55.

A pair of swing power clamps 58 and 59 are provided. These are pivotally mounted upon some portion of the swing arm 22 and includes a suitable power means such as a pneumatic cylinder with linkage by which the swing clamp arm 71 is progressively moved into operative retaining engagement with the workpieces W and W' upon support or fixture 55.

At this time, the workpieces W and W' may be effectively welded together or otherwise machined as desired.

As shown schematically in FIG. 1, to fill and to cover the space between open portions of the housing and the swing arm in its locating position at its forward end with respect to said housing as well as its rearward end there are provided a pair of rubber or plastic expansion manifolds 64 and 65 which are of such resiliency as to cover and exclude from the interior of the housing any dirt or other substances which might interfere with the operation of the present precision clamping device.

FIG. 3 illustrates in a perspective view the complete clamping mechanism and with particular emphasis of the means by which the swing arm mounts the swing clamps for securing the pair of assembled workpieces W and W' upon the support or fixture 55 having a predetermined contour 56 as schematically shown.

Upon the swing arm 22 there is provided a transverse elongated support bar 57 mounted upon its forward surface. It is understood that the bar 57 could be mounted upon any of its other surfaces of the swing arm 22.

Mounted upon outer portions of the bar 57 are a pair of power operated swing clamp assemblies 58 and 59. One of which is described in further detail.

Said swing clamp 58 includes mounting base plate 60 anchored to the transverse bar 57 by fasteners 61 and including an upstanding spacer flange 62 shown in dotted lines which projects between and is fixedly secured to housing sideplates 66 by fasteners 63. Said sideplates are further spaced apart by spacer 67.

Housing sideplates at their ends terminate in the right angular flanges 68 for mounting cylinder heads 69 of the power pneumatic cylinder assembly 70 which includes at its opposite ends a pair pressure ports PA and PB.

The power clamp includes swing arm 71 which is interposed between the housing sideplates 66 and pivotally mounted thereon at 72.

The power cylinder assembly 70 includes a reciprocal piston and piston rod which through a suitable linkage not shown is pivotally and flexibly connected to a portion of the swing arm 71 spaced from its pivot mounting 72 in such a manner that at the proper time upon pressurizing of port PA, after the swing arm has swung to the solid line locating position shown in FIG. 3, the pivotal swing arm 71 moves from the retracted position shown, progressively through and into workpiece-clamping and retaining position with the clamping die 73 operatively engaging workpieces W and W'.

The secondary power swing clamp assembly 59, though not described in detail, also includes a suitable swing arm similar to arm 71 and which under the control of a power cylinder is adapted after proper location for swinging into the workpiece-anchoring position shown in FIG. 3, to retainingly engage workpieces W and W' with respect to the fixture F.

OPERATION

In operation, assuming workpiece W and workpiece W' have been initially assembled loosely together as shown in FIGS. 3 and 4 upon the support base 55, the locating swing arm 22 is in the retracted "swing away" position shown. Similarily the clamp arm assembly 58 has been swung away to provide a clearance for the assembly of the workpieces W and W' with respect to support 55.

Pressure fluid, such as compressed air, indicated at P, FIG. 1 is directed to the four-way valve 37 and depending upon the valve mechanism will be pressurizing either of the cylinder ports P1 or P2.

In the normal workpiece locating position of the swing arm 22 as shown in FIG. 1, port P1 has been pressurized and similarily, ports P3.

This has caused the piston rod assembly 36 to move to the extreme left-hand position with the respective bearings 44 engaging along angular slots 31 of the swing arm cam wedging the swing arm to the extreme solid line locating position shown in FIG. 1.

Ports P3 have been pressurized also so that the pistons 48 have moved operatively inward for lateral retaining and guiding and sliding engagement with lower end portions of the swing arm sideplates 23. At that time, port P2 is open to exhaust through the four-way valve 37, FIG. 1.

To secure the instantaneous release of the workpieces, the valve 37 is reversed with the result that port P2 is pressurized and the ports P1 and P3 connected with the atmosphere for a quick return of swing arm 22 to the "swing away" release position shown in dotted lines, FIG. 1.

With rollers 44 moving within angular slots 31, and with the support bearings 45 guidably movable within housing sideplate slots 32 there is an initial fast action of swing arm 22 from "release" position towards "workpiece-locating" position. However, as the swing arm gradually moves towards locating position, its speed of movement is slowed down appreciably for a smooth locating function with respect to the assembled workpieces W-W'. This function is built into the construction above described.

With the swing arm 22 in locating position and by remote control, the power operated swing arms 71 are activated by pressurizing port PA of the power cylinder 70, FIG. 3. This causes the piston and piston rod assembly forming a part of the power cylinder to retract and through a suitable linkage, effects a pivotal movement of the swing clamp arm 71 about its pivot 72 from the retracted position shown, FIG. 3, to the workpiece engaging position shown in solid lines.

The workpieces W and W' upon the support 55 are now properly retained in position for a welding or other operation.

FIG. 3 shows a secondary power clamp assembly 59 which is adapted to simultaneously engage a secondary pair of workpieces W and W' upon a fixture F when the swing arm 22 is in its locating solid line position, FIG. 3.

Having described my invention, reference should now be had to the following claims:

I claim:

1. In a power operated locator, a housing including a base plate mountable upon a support, a pair of spaced housing sideplates with opposed elongated bearing slots therethrough;
   a power cylinder with reciprocal rod supported within one end of the housing on an axis coplanar with the slot axes;
   a swing arm including a pair of spaced swing arm sideplates interposed between and adjacent respectively said housing sideplates and pivotally mounted thereon upon an axis transverse to and displaced from the rod axis;
   there being a pair of opposed elongated bearing slots through said swing arm sideplates extending at an acute angle to said housing sideplate slots;
   a rod end block upon the end of the cylinder rod;
   a bearing shaft extending through said block and transversely through said housing and swing arm sideplate slots;
   roller bearings journaled on said shaft and movably mounted within said slots respectively, whereby reciprocal movements of said rod effect pivotal movements of said arm between "workpiece locating" and "swing away release" positions;
   a transverse stop block assembly extending between and secured to said housing sideplates rearwardly of said swing arm sideplates;
   and a pair of stop blocks mounted upon the rear edges of said swing arm sideplates normally spaced from said stop block assembly when the arm is in "swing away release" position and parallel to and operatively engageable with the stop block assembly limiting the positioning of said swing arm in workpiece "locating" position.

2. In the power operated locator of claim 1, the mounting of said cylinder including longitudinally spaced opposed pairs of support pins threaded through said housing sideplates and snugly nested within corresponding outwardly opening bores in the cylinder wall.

3. In the power operated locator of claim 1, the pivot mounting of said swing arm including a pivot shaft extending between and secured to said housing sideplates;

thrust washers on said shaft snugly interposed between said swing arm and housing sideplates;

there being a pair of opposed transversely arranged cylinder bores in interior wall portions of said housing side plates remote from said pivot shaft;

and a piston in each cylinder bore movable laterally inward on application of pressure fluid to said cylinder bores for operable compressive sliding engagement with said swing arm sideplates;

said thrust washers and pistons acting as lateral retainers for guiding said swing arm and eliminating slop between said swing arm and housing sideplates.

4. In the power operated locator of claim 3, retainer plates mounted upon the exterior of and secured to said housing sideplates;

and fasteners extending through said retainer plates and axially secured to said pivot shaft at its opposite ends;

said retainer plates closing off the housing sideplate slots and retaining the bearings therein.

5. In the power operated locator of claim 1, said stop block assembly including a stop block holder plate secured to and spanning said housing sideplates; and, spaced stop blocks secured upon the under surface of said holder plate adapted for operative retaining engagement with said arm stop blocks.

6. In the power operated locator of claim 1, there being a workpiece support for a pair of loosely assembled workpieces;

and a power operated swing away clamping means mounted on said swing arm adapted to operatively and retainingly engage said workpieces on said support.

7. In the power operated locator of claim 6, said clamping means including a transverse support bar secured to said swing arm;

a power cylinder operated swing clamp mounted on said bar including a swing clamp housing; a power cylinder;

and a swing arm pivoted on said swing clamp housing and connected to said latter power cylinder, adapted on pressurizing of said latter power cylinder to swing into workpiece-securing position.